Oct. 20, 1936. A. C. PURPURA 2,057,741
EGG COOKER
Filed May 5, 1934
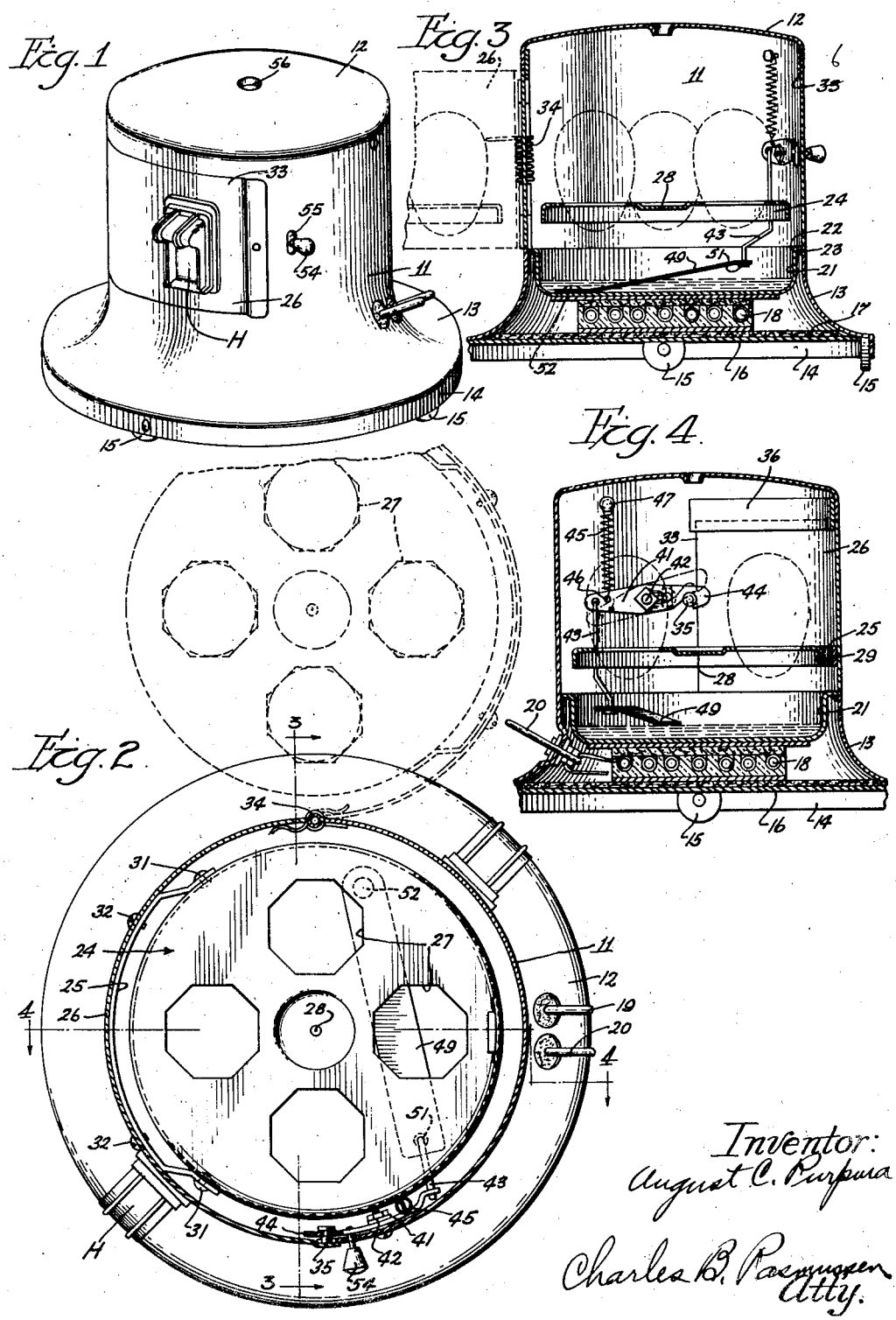

Patented Oct. 20, 1936

2,057,741

UNITED STATES PATENT OFFICE 2,057,741

EGG COOKER

August C. Purpura, Chicago, Ill.

Application May 5, 1934, Serial No. 724,022

7 Claims. (Cl. 53—1)

This invention relates to apparatus for cooking or boiling eggs, and has for its object broadly the provision of a device which is adapted to receive a plurality of eggs and which will automatically eject the same after a predetermined length of time.

Heretofore, it has been customary to immerse the eggs in a large amount of water which must first be heated to boiling point, or to use dry heat such as supplied by electric egg cookers. The objection to these methods has been that in the former it is necessary to heat a large amount of water in order to have the eggs cook evenly, while in the latter certain disadvantages are encountered, such as excessive hardening of the egg shell, unpleasant tastes and unevenly cooked albumen.

A principal object of my invention is the provision of an egg cooker in which a very small amount of liquid is necessary to supply steam for the cooking operation rather than immersing them in water or subjecting them to dry heat.

Another important object of the invention is the provision of a simple and compact device adapted for connection to any electrical outlet and in which means are provided for automatically controlling the length of time desired for the cooking operation.

Another important object of the invention is the provision of a device of this character in which the container for the water is accessible from the exterior of the device to permit the operator to determine the amount of water to be used.

A further object of the invention is the provision of a device of this character in which the eggs are automatically removed from the sphere of heat after a predetermined cooking period has elapsed.

Numerous other objects and advantages of the invention will be apparent as it is better understood from the following description, which, when taken in connection with the accompanying drawing, discloses a preferred embodiment thereof.

On the drawing,

Figure 1 is a perspective view of the device embodying my invention;

Fig. 2 is a horizontal section of the egg cooker showing the door and egg holder swung outwardly, in broken lines, in a released position;

Fig. 3 is a vertical cross sectional view taken substantially on the line 3—3 of Fig. 2; and Fig. 4 is a vertical cross sectional view taken substantially on the line 4—4 of Fig. 2.

Referring to the drawing, reference character 11 designates the main circular body portion or housing of the cooker, having at its top a closure 12 and at its base a flared circular portion 13 having a downwardly extending peripheral flange 14 which serves as a fastening means for the feet or supports 15.

Mounted within the base 13 and preferably fastened to the flange 14 is a plate 16 having secured on its surface an insulating plate 17. Mounted upon this insulating plate is a conventional type of electric heater 18 with a heating coil supported in refractory material and adapted to be connected, through leads 19 and 20 projecting from the base, to a source of electric current, not shown.

Disposed within the body portion of the cooker and resting upon the heater 18 is a container 21 of relatively shallow form for holding water. This container is provided with a horizontally disposed flange 22 adapted to engage the wall of the housing 11 and be secured thereto as at 23. When the heater 18 is energized, the liquid in the container 21 is converted into steam, the period for effecting this boiling period being dependent upon the amount of water introduced into the container.

Directly above the liquid container 21 is an egg holding tray 24 fixedly mounted through a strap 25 to a hinged door 26 for the housing 11. This egg holding tray or support is circumferentially spaced from the housing 11 and is provided with octagon shaped openings 27 for the reception of the eggs, although other shaped openings may serve as well. This egg holding tray is also provided with a central opening 28 to permit the flow of steam between and around the eggs. A downwardly depending flange 29 is provided on the periphery of the egg holding tray and is adapted to be fastened to the strap 25 by rivets 31 or other suitable fastening means, this strap in turn being fixedly secured to the door 26 by screws 32 or the like.

The door 26 is arcuate in shape to conform to the cylindrical shape of the body portion or housing 11 and it is of sufficient width and height to close the opening 33 of the housing during the cooking operation. A handle H is provided between its ends. A spring hinge 34 is provided at one end about which the door may swing and a latch pin 35 is positioned close to the other end. When closed, the door engages a stop plate 36 which may be fastened to the housing 11 or form an integral part of the same.

The mechanism for operating the assembly of the door and egg support comprises a latch lever 41 pivoted at 42 to the housing 11 and having at one end an opening for the reception of a connecting link 43. The other end of the latch lever 41 is provided with the latch hook 44 adapted to embrace the latch pin 35 of the door. A tension spring 45 is fastened at its lower end at 46 to the latch lever 41 near the opening for the link 43, and at its upper end it is anchored at 47 to the housing 11. The spring serves normally to urge the latch hook 44 into engagement with the latch pin 35.

The lower end of the connecting link 43 is fastened at 51 to one end of a bimetal strip 49, the other end of the bimetal strip being fastened to the inner surface of the liquid container 21 at 52. Deformation of this strip will be dependent primarily upon the temperature of the liquid or steam in the pan 21, and as the temperature increases the free end of this strip is deflected downwardly.

The latch lever 41 also has secured to it a knob 54 projecting through a slot 55 in the housing 11 for manually operating the lever, when desired.

A vent 56 is provided in the closure 12 for the escape of steam.

The operation of the device is simple and reliable. Manipulation of the knob 54 opens the door 25 carrying with it the egg holding tray 24. A few teaspoonfuls of water are put into the container 21, then the eggs are placed in the egg holding tray and the door closed and automatically latched. In the swinging movement of the door to closed position, the latch pin 35 strikes the bevelled hook end of the lever 41 causing it to rise until the pin 35 has been gripped by the hook and spring 45 causes the lever to drop over the latch pin, thus holding the door tightly closed.

When the heater 18 is energized, the liquid in the container 21 is brought to boiling point very quickly and the steam flows around and envelopes the entire surface of the eggs. As soon as a predetermined temperature is reached, the bimetallic strip 49 expands, causing the latch lever to assume the position shown in broken lines in Fig. 4 to release the door which will then swing outwardly under the influence of the spring hinge 34 to a position where the eggs may be removed.

It will be understood that the degree of cooking is determined solely by the amount of water placed in the container 21.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a device of the character described, the combination of a support for eggs, a steam generator, means for holding the support in operative position relative to the steam generator, means secured to the steam generator for releasing the egg support from the holding means when a predetermined quantity of steam has been generated, and means for moving said egg support out of operative relationship with said steam generator upon release of said support from said holding means.

2. In a device of the character described, a housing, an egg support in the interior of the housing and spaced circumferentially from the same, a container for water, heating means for the container adapted to generate steam from said water container to flow through the interstices between the egg support and the housing, means for locking the egg support within the housing in position above the container of water, means for releasing said locking means in accordance with the quantity of water converted into steam by said heating means, and means for moving said egg support out of said housing and away from said container upon operation of said releasing means.

3. In a device of the character described, the combination of a housing, a container for water open at the top and located in the interior of the housing, heating means below said container, a door for the housing, a support for eggs secured to the door, a latch connecting said door with the housing to maintain said support within said housing above said container, means for releasing said latch, said releasing means being under control of the heat evolved from said container, and means for opening said door to move said support out of said housing upon release of said latch.

4. In a device of the character described, the combination of a cylindrical housing having an opening in its cylindrical wall, an arcuate door adapted to close said opening, a flat egg support fixedly secured to the door, a water container circumferentially secured to the inner wall of the housing below said opening, a thermostatic strip fixed to the bottom of said container at one end, a latch lever pivoted on the housing, a latch pin secured to the door, means for normally holding said latch lever and latch pin in operative engagement, means connected with said thermostatic strip for releasing said latch lever from the door holding position, and means for opening said door to move said egg support out of said housing upon release of said latch lever.

5. In a device of the character described, the combination of a housing, a door pivotally mounted on the housing, an egg support secured to the door, a shallow container for water secured to the wall of the housing, a thermostatic strip fastened to said container, latching means connected with said housing and door respectively for holding the door normally in closed position, means actuated by said thermostatic strip for positively releasing said latching means, and means for swinging said door to open position upon release of said latching means.

6. In a device of the character described, the combination of a housing, an egg support movably supported in said housing and spaced from the circumferential wall thereof, a container for water in the interior of the housing, means for converting said water into steam, a latching mechanism for normally holding the egg support in predetermined position relative to the housing, a thermostatic element connected with the container for water, means for connecting said thermostatic element with said latching mechanism adapted to release said latching mechanism when said thermostatic element has been subjected to deformation under heat, and means for positively moving said egg support out of the housing upon release of said latching means.

7. In a device of the character described, the combination of a housing closed at the top and having an opening in a side wall thereof, a door mounted on a vertical pivot in said housing and adapted to close said opening, a rack for supporting the article to be cooked mounted on said door so as to be within the housing when the door is closed, an electric heating element within said housing, and means for opening said door upon the completion of a cooking operation.

AUGUST C. PURPURA.